United States Patent

Packer et al.

[15] 3,635,530
[45] Jan. 18, 1972

[54] ANTISKID SYSTEMS AND APPARATUS FOR VEHICLES

[72] Inventors: Mervyn Brian Packer; Gordon W. Judge, both of Leamington Spa, England

[73] Assignee: Automotive Products Company Limited, Leamington Spa, England

[22] Filed: Jan. 8, 1970

[21] Appl. No.: 1,492

[30] Foreign Application Priority Data

Jan. 9, 1969 Great Britain .......................1,429/69

[52] U.S. Cl. ............................303/21 P, 188/181 R, 303/20
[51] Int. Cl. ...........................................B60t 8/12, B60t 8/08
[58] Field of Search ...................188/181; 303/21, 20; 317/5; 324/70 A, 70 C–70 G, 181, 162; 340/71, 72, 262, 263, 52 R

[56] References Cited

UNITED STATES PATENTS

| | | | |
|---|---|---|---|
| 3,494,671 | 2/1970 | Slavin et al. | ...........................303/21 P |
| 3,525,553 | 8/1970 | Carp et al. | ..............................303/21 P |
| 3,362,757 | 9/1964 | Marcheron | ...........................303/21 P |

Primary Examiner—Milton Buchler
Assistant Examiner—Stephen G. Kunin
Attorney—Lawrence J. Winter

[57] ABSTRACT

In an antiskid system for vehicles, brake control apparatus for automatically controlling the application of braking pressure to the wheels including sensing means such as a tachogenerator for producing electrical signals which are analogues of wheel speed, means for differentiating the analogue signal transducer means producing signals indicative of vehicle deceleration, means for producing a reference signal having a value determined in accordance with vehicle deceleration, dual-mode integration means responsive to said analogue and reference signals to produce output signals representative of wheel speed when the integrator operates according to one mode and to produce output reference signals representative of vehicle speed and controlled by vehicle deceleration when the integrator operates according to the second mode, a first comparator device responsive to the differentiated signals and a second comparator device being responsive to signals from the first comparator device and the integration means to produce a control signal for the actuation of antilock control valve means to reapply the braking pressure whenever the wheel speed signal is equal in magnitude to the reference speed signal.

5 Claims, 6 Drawing Figures

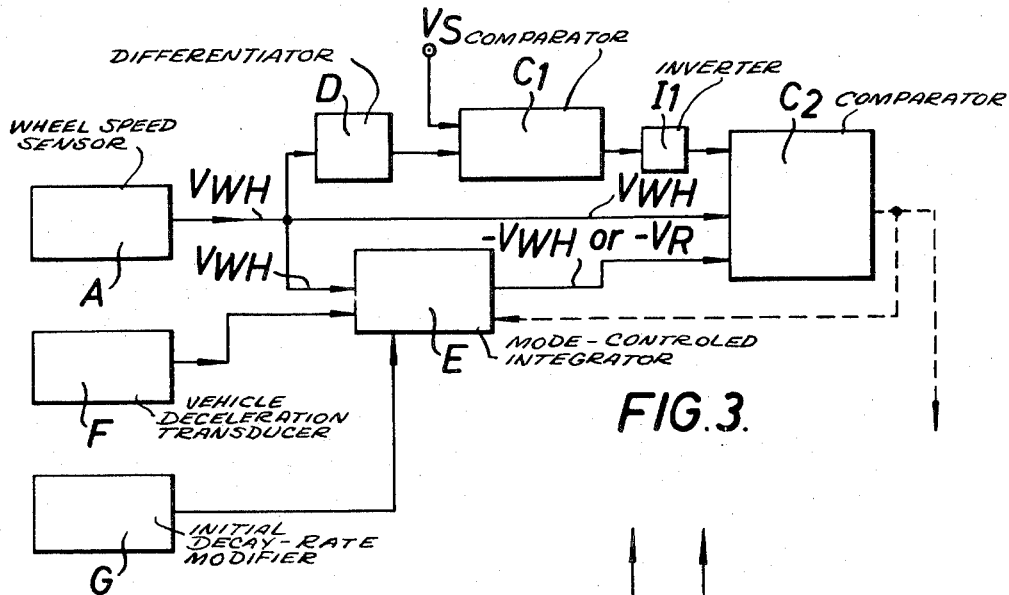
FIG.3.
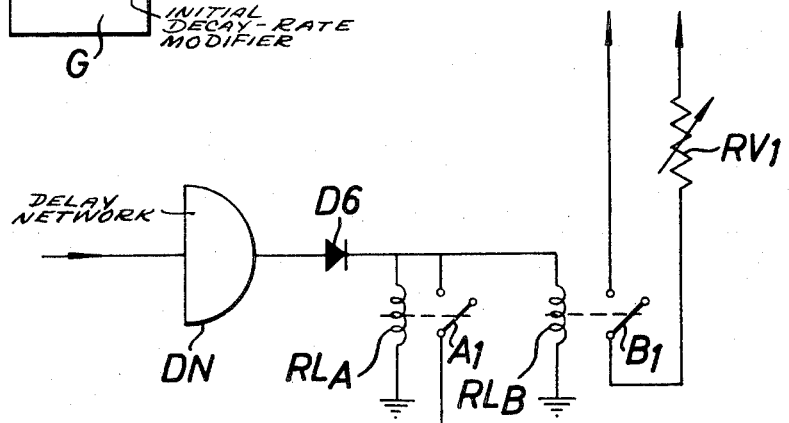
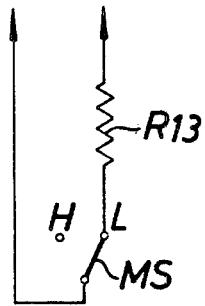
FIG.5.
FIG.6.

ANTISKID SYSTEMS AND APPARATUS FOR VEHICLES

This invention relates to antiskid systems and apparatus for vehicles in which the fluid pressure in the braking system for the application of braking pressure to the wheels of the vehicle, is automatically controlled in accordance with the existence of any tendency of the vehicle towards a wheel lock or skid condition.

An object of the present invention is to provide a reference signal having a value determined in accordance with vehicle deceleration such that the brakes, which are released during wheel deceleration, may be reapplied at a predetermined wheel or associated component speed equivalent to the reference signal.

Thus, according to the present invention in a brake pressure control system there is provided sensing means for producing electrical signals indicative of vehicle wheel or associated component speed, braking pressure valve control means responsive to electrical signals indicative of wheel deceleration in excess of a predetermined value to effect brake pressure relief, means for generating an electrical reference signal having a value determined in accordance with vehicle deceleration and further means responsive to said reference signals and said wheel or associated component speed signals to effect actuation of said brake valve control means to reapply the braking pressure when a selected relationship exists between the reference and wheel or associated component speed signals.

In a preferred embodiment of the invention the wheel speed sensor may comprise a tachogenerator arranged to generate signals indicative of wheel speed which are differentiated and the differentiated signals supplied to a first comparator device responsive to the differentiated signals indicative of wheel deceleration and to produce an output signal to relieve the brake pressure whenever the wheel deceleration exceeds a predetermined value, e.g., $1g$. The wheel speed signals are also supplied to the input of a mode-controlled integrator responsive also to signals indicative of vehicle deceleration such as to produce output signals representative of wheel speed when the integrator operates according to one mode and arranged to produce output reference signals representative of vehicle speed and controlled by vehicle deceleration when the integrator operates according to a second mode, the output signals, from the tachogenerator, first comparator device and integrator being supplied to the inputs of a second comparator device to produce a control signal for actuation of antilock control valve means to reapply the braking pressure whenever the wheel speed signal is equal to the reference speed signal.

Such a preferred embodiment of the invention will now be described by way of example only with particular reference to the accompanying drawings wherein:

FIG. 3 is a block diagram showing the interrelationship between the various components required to effect brake relief and reapplication;

FIGS. 5 and 6 are circuit diagrams showing alternative means for adjustment of the vehicle deceleration reference level.

Figure 1:
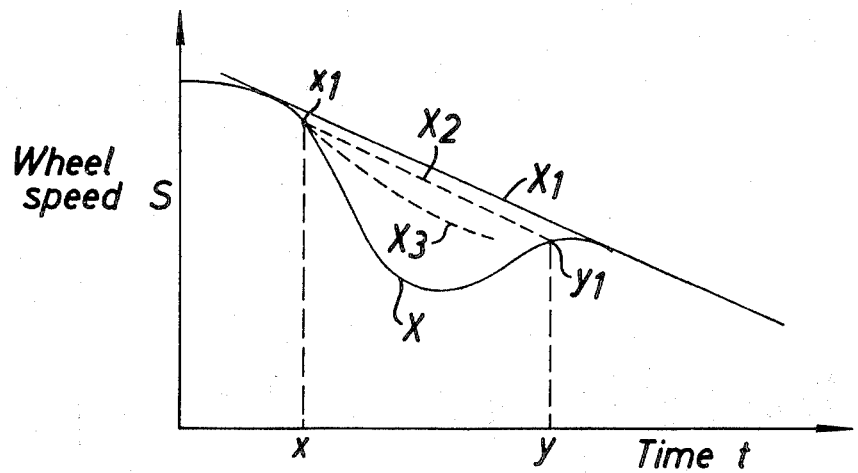
FIG. 1 is a graph showing wheel speed $s$, plotted to a base of time $t$.

Referring to FIG. 1, curve X is a graph of wheel speed $s$ plotted to a base of time $t$ showing point $x_1$ where a skid is sensed and the brakes released until subsequent wheel deceleration and wheel acceleration to point $y_1$ on curve X and reference curve $X_2$ where the brakes are reapplied. The slope of the reference curve $X_2$ is controlled in accordance with vehicle deceleration and the slope of vehicle speed is shown by curve $X_1$.

The system of the present invention may be used with a limited brake relief system such as described in copending Pat. application Ser. No. 791,231 but will be described without reference to such a system.

Figure 2:
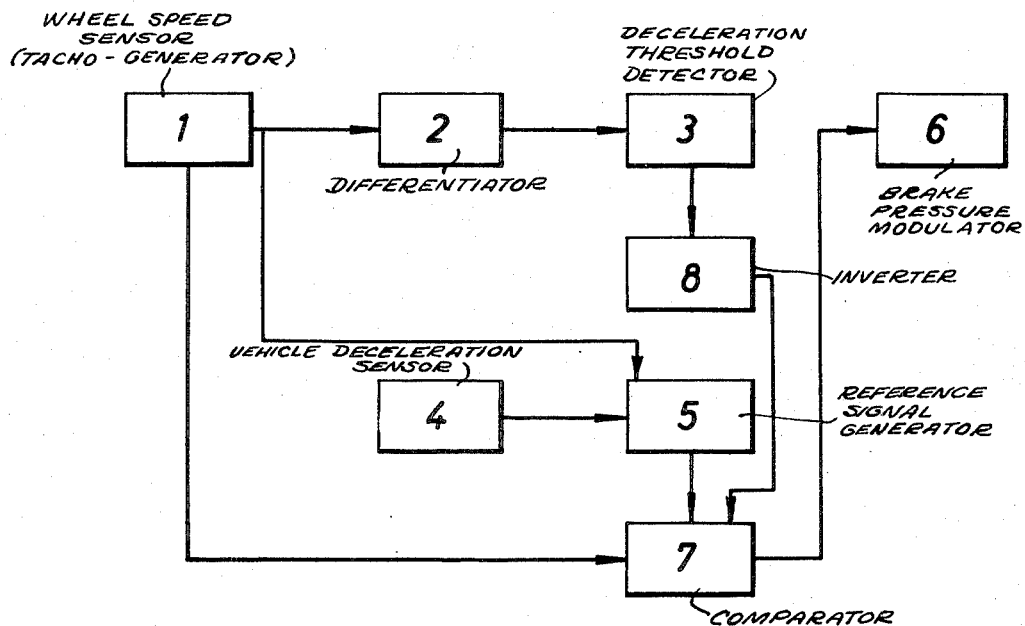
FIG. 2 is a flow diagram illustrating the various steps required to achieve relief and reapplication of the brake pressure.

FIG. 2 is a flow diagram itemizing the various steps in the brake reapplication system of the present invention. Wheel speed is sensed at 1 and the signals differentiated at 2. Wheel deceleration in excess of, for example, $1g$ is sensed at 3 to provide an output signal which is applied via inverter 8 and comparator 7 for the relief of brake pressure at 6. Signals indicative of vehicle deceleration are produced at 4 and used to generate reference signals in accordance with vehicle deceleration at 5. The comparator 7 is responsive to signals from 1 and 5 to reapply the brakes at 6 when the wheel speed signal is equivalent to the reference signal.

Referring to FIG. 3, a tachogenerator or like wheel speed sensor A is arranged to produce voltage signals $V_{WH}$ which are an analogue of wheel speed $s$. These signals are passed in parallel to a first comparator $C_1$ via differentiator D, to a comparator $C_2$ which receives output signals from comparator $C_1$ via inverter I, and to a mode-controlled integrator E which also feeds output signals to comparator $C_2$ in conjunction with output signals $V_{WH}$; comparator $C_1$ receives a voltage signal $V_s$ which is an analogue of a wheel deceleration value equivalent to $1g$. Signals indicative of vehicle deceleration are produced by transducer F giving a voltage which is fed into the mode-controlled integrator E through one input thereof in order to set a decay rate for the reference voltage $-V_R$. An initial decay-rate modifier G is provided to supply signals to integrator E to provide the slope $x_3$ (FIG. 1) which differs from slope $x_2$ for a purpose hereinafter described. The comparator $C_2$ receives signals $-V_{WH}$ or $V_R$ from integrator E according to the reset mode or compute mode respectively as will be hereinafter explained.

Figure 4:
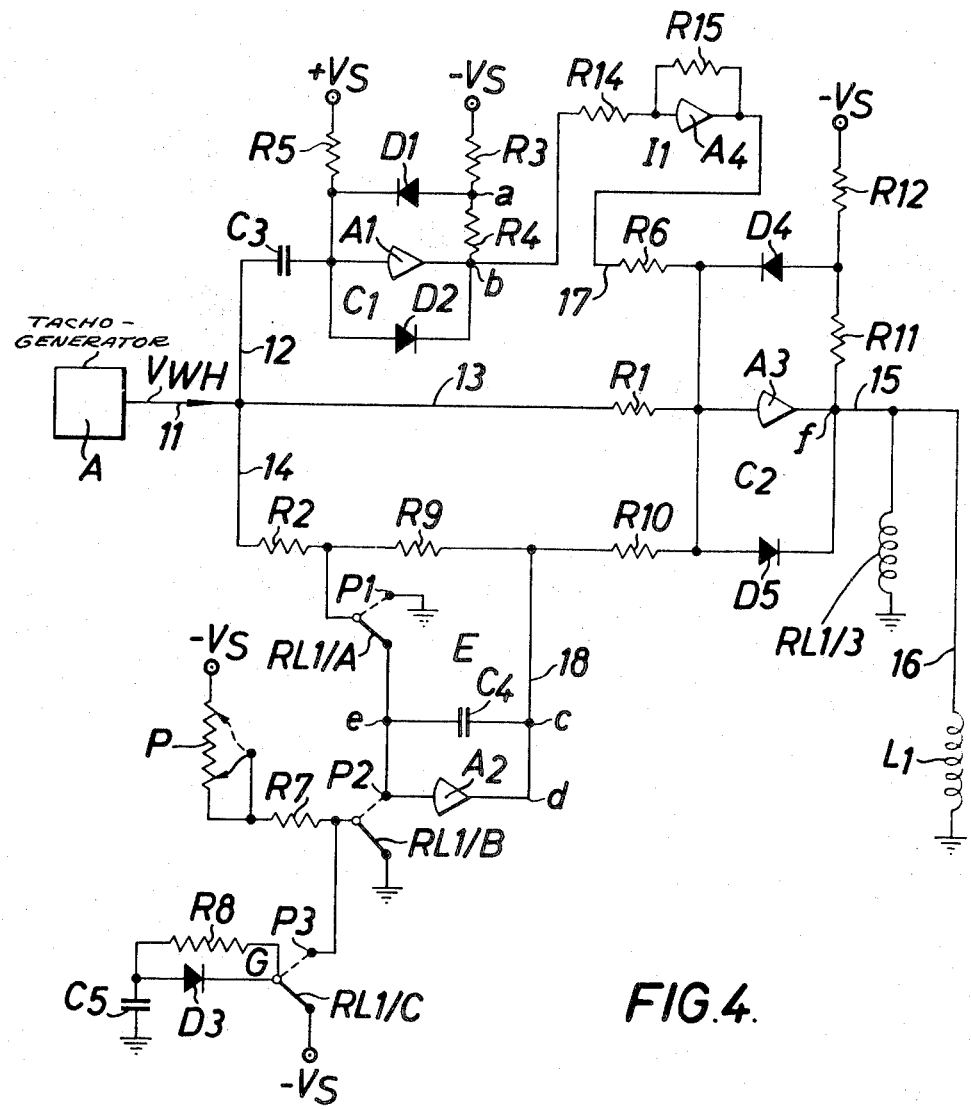
FIG. 4 is a circuit diagram illustrating the various components such as the two comparator devices, sensing means and mode-controlled integrator necessary to achieve brake relief and reapplication under certain conditions

Referring to FIG. 4, the tachogenerator A produces on output line 11 thereof, a positive voltage signal $V_{WH}$ proportional to wheel speed and this signal $+V_{WH}$ is applied via lines 12, 13 and 14 to the input of comparator $C_1$ via differentiator capacitor $C_3$, to one input of comparator $C_2$ via resistor $R_1$, and to the input of the mode-controlled integrator E via input resistor $R_2$ respectively. Comparator $C_1$ comprises an operational amplifier A1 having a diode D1 connected between the input thereof and junction $a$ of voltage divider R3/R4 connected between the output point $b$ of amplifier A1 and voltage source $-V_S$. The input of amplifier A1 is connected to voltage source $+V_S$ via resistor R5. An oppositely poled diode D2 is connected across the input and output terminals of the comparator C1 and the output of comparator C1 is connected via resistor R6 to one input of comparator C2. Inverter $I_1$, comprises an operational amplifier A4 having the input thereof connected to point $b$ via resistor $R_{14}$ and having a resistor $R_{15}$ connected across the input and output terminals thereof.

Mode-controlled integrator E comprises a pair of relay contacts RL1/A, RL1/B operable in response to energization of coil RL1/3 connected to the output of comparator C2, to change the contacts to position $P_1$, $P_2$, respectively. A high-gain operational amplifier A2 is connected via normally closed contact RL1/A and resistor R2 to the output of tachogenerator A. A capacitor $C_4$ is connected across the input and output terminals of the amplifier A2 and the input of amplifier A2 is connected to point $P_2$ of relay contact RL1/B. Whenever relay coil RL1/3 is energized, contact RL1/B will be switched to position $P_2$ to couple the input of amplifier A2 to the slider of potentiometer P via resistor R7, the contact RL1/B of relay coil RL1/3 being normally connected to earth and point $P_1$ of relay coil contact RL1/A being connected to earth as shown. The slider of potentiometer P which is controlled positionally according to vehicle deceleration is shown in full and in dotted lines; the full line position being used for the setting of a reference voltage in accordance with low vehicle deceleration, and the dotted line position being used for a high vehicle deceleration reference voltage. The initial decay-rate modifier G comprises a contact RL1/C normally connected to a negative voltage source $-V_S$ and actuatable between the position shown and point $P_3$ in response to energization of relay coil RL1/3. A parallel-connected resistor R8 and diode D3 is normally connected through relay switch RL1/C between source $-V_S$ and earth via capacitor C5. A feedback resistor R9 is connected between the output terminal $c$ and the input of integrator E and the comparator C2 is connected to the output of integrator E via resistor R10. Comparator C2 comprises operational amplifier A3 having diode D4 connected between the input thereof and the junction of voltage divider R11/R12, connected between voltage source $-V_S$ and the output point $f$ of the comparator C2. An oppositely poled diode D5 is connected across amplifier A3 and the output of comparator C2 is connected to earthed relay coil RL1/3 via line 15 and via line 16 to the earthed winding $L_1$ of the solenoid controlling the antilock control valve. Diode D4 is of the same polarity as diode D1 which is oppositely poled with respect to diode D5.

The operation of the circuit of FIG. 4 is as follows:

Referring firstly to comparator C1, when the wheel is decelerating current flows from the input of the comparator into the capacitor C3 and flows from resistor R5 into the input of the comparator. The output point $b$ of comparator C1 tends towards a negative potential but is limited by the positive potential at point $a$. When wheel deceleration exceeds the value set by $+V_S$ and R5, current flows through diode D1 increasing the potential difference across R4 until point $a$ returns to earth potential. Thus point $b$ is held at a certain limited potential while the wheel deceleration exceeds the set value to give an output on line 17 via inverter I, to one input of comparator C2. When the deceleration is such that the current at C3 exceeds the current from R5, the net current flow is away from the input of amplifier A1 which is equivalent to a net input voltage at the input of the comparator C1, so the output point $b$ tends to go positive but when point $a$ reaches zero potential, point $b$ is limited to a positive potential thus maintaining the signal on line 17 negative, due to the action of inverter $I_1$, until the wheel deceleration falls below the low value set by voltage $V_S$, and resistor R5, when the signal falls to zero.

The operation of the mode-controlled integrator E is as follows:

The integrator is shown in the RESET mode where the tachogenerator A supplies voltage $+V_{WH}$ via lines 11, 14 and input resistor R2 to the input of the integrator. The output end of resistor R2 is at virtual earth potential such that a current proportional to wheel speed flows to point $e$. Except for a small dynamic lag due to capacitor C4, the voltage at point $c$ is $-V_{WH}$. Thus capacitor C4 is charged to the value of voltage $-V_{WH}$, and signal $-V_{WH}$ appears on line 18 during the RESET mode and is applied to an input of comparator C2 via resistor R10.

In the COMPUTE mode of integrator E, i.e., relay coil RL1/3 has been energized and contacts RL1/A, RL1/B switched to positions $P_1$, $P_2$, respectively, the voltage on the slider of potentiometer P is proportional to vehicle deceleration and is applied to resistor R7 drawing current proportional to vehicle deceleration away from point $e$. This current comes from capacitor C4 and is equivalent to feeding negative charges to the left-hand plate of capacitor C4. Since the right-hand plate of capacitor C4 has acquired a negative potential during the RESET mode, and thus point $c$ has a negative potential, the net charge difference across capacitor C4 will be reduced, with consequent reduction in the potential difference across the capacitor. However, since the input side of capacitor C4 is at earth potential, the right-hand side will fall in value from the value attained during the RESET mode. The negative voltage at point $d$ will thus tend towards zero at a rate dependent upon the setting of the slider of potentiometer P, if the values of $-V_S$, R7 and C4 are fixed. It can be shown that this rate of decay of the voltage is substantially constant for a particular setting of the slider of potentiometer P.

Referring now to the operation of comparator C2 and the effect thereon of the different states of comparator C1 and the two modes of integrator E, under normal braking conditions, there will be a zero voltage signal on output line 17 of comparator C1 since the wheel deceleration has not exceeded the sense level, e.g., 1g set by the values $+V_S$ and R5. The other two input signals to comparator C2 will be $+V_{WH}$ from tachogenerator A on line 13 and $-V_{WH}$ from mode-controlled integrator E in the RESET mode. Thus, the net value of the voltage applied to the inputs of comparator C2 is zero since the wheel speed voltages $+V_{WH}$ and $-V_{WH}$ cancel out and no output signal will be present on output lines 15 or 16. Thus there will be no energization of coil RL1/3 or of solenoid winding L1.

For the antilock braking condition, a negative voltage will be produced on line 17 and applied via resistor R6 to the input of comparator C2 when the wheel deceleration exceeds the sense level set by $-V_S$, R3 and R4. This provides a net negative input at the inputs of comparator C2 and effects energization of coils RL1/3 and L1. Contacts RL1/A and RL1/B will be switched to positions $P_1$, $P_2$, and $-V_R$ is computed and produced on line 18 in accordance with vehicle deceleration. Provided $V_{WH}-V_R$ is less than zero, the net input voltage to comparator C2 will be negative and the coil RL1/3 and solenoid winding L1 will remain energized to effect brake relief via the antilock valve control means. However by the time $V_{WH}-V_R$ returns to zero again, the output voltage signal from comparator C1 will also have returned to zero, i.e., when the wheel deceleration no longer exceeds the set level, e.g., 1g set by the value of $+V_S$ and R5 and thus when $V_{WH}-V_R=0$, the net input to comparator C2 will be zero and the output line 15 will have a zero voltage thereon. This will cause deenergization of coil RL1/3 and solenoid winding L1 and also cause the brakes to be reapplied. Relay contacts RL1/A and RL1/B will revert to their normal positions and the output from the integrator will revert to the value $-V_{WH}$.

The initial decay-rate modifier G comprises elements C5, R8 and D3 connected as shown in FIG. 4 and the purpose of these elements together with contact RL1/C is to modify the initial rate of decay of the reference voltage as shown for curve $x_3$ of FIG. 1.

When the integrator E is operating in accordance with the reference "COMPUTE" mode, the effect of potentiometer P and the voltage taken off by the slider thereof is to feed negative charge to point $P_2$ of the operational amplifier A2 dependent upon the setting of potentiometer P and thus of vehicle deceleration. Thus, in order to increase the rate of decay of the "reference" it is necessary to increase the rate of change of electron flow. To achieve slope $x_3$ it is necessary to augment the constant electron flow into $P_2$ from P during the COMPUTE mode when contact RL1/B has been switched, by an additional flow whose rate decays with time. Thus, the reference starts at, for example, 1g, but quickly changes to a rate approaching vehicle deceleration. The additional electron flow is derived from capacitor C5 which during the RESET mode of integrator E, is connected through diode D3 (which allows a quick-charging bypass of resistor R8) to the negative voltage source $-V_S$, thereby storing electrons on the upper plate of capacitor C5. When contact RL1/C switches to position $P_3$ due to the coil RL1/3 being energized, this store of electrons escapes through resistor R8 to point $P_2$ of operational amplifier A2 at a rate which decays with time; diode D3 blocking direct flow of electrons from capacitor C5.

It will be appreciated that the invention is susceptible of considerable modification and is not to be deemed limited to the particular circuit details described by way of example only. For instance the initial decay-rate modifier G may or may not be included in the circuit.

As previously indicated in connection with the circuit of FIG. 4, the position of the slider of potentiometer P is controlled in accordance with vehicle deceleration and a dotted and a full line position is shown for the production of a reference voltage $V_R$ in accordance with high or low vehicle deceleration respectively.

Ideally, by the time the transducer F (FIG. 3) has sensed the vehicle deceleration under antilock conditions, the voltage reference signal $V_R$ should be a true electrical analogue of the maximum vehicle deceleration for the conditions existing at the time the vehicle deceleration is sensed. However, in practice, by the time the first wheel of the vehicle skids, the vehicle may not be experiencing maximum vehicle deceleration or the response of the transducer sensing vehicle deceleration may be too slow, or the first sensing by the transducer may be premature. Accordingly to compensate for any variation of the sensed vehicle deceleration from the true or maximum value and to adjust the reference level, the circuits of FIGS. 5 or 6 may be provided.

It is assumed that the "electrical antilock system" includes a fixed resistor, in the basic circuit thereof (not shown in FIGS. 5 or 6) which provides an arbitrary, e.g., 1g basic reference sensing level for vehicle deceleration. In order to adjust the reference level in accordance with the actual vehicle deceleration either a variable resistor RV1 is provided (FIG. 5) having the slider thereof positioned by the vehicle deceleration sensing transducer to produce a voltage signal which adjusts the reference set by the fixed resistor of the "electrical antilock system," or alternatively, a microswitch (FIG. 6) is arranged to connect a fixed resistor into the circuit so as to reduce the reference deceleration level when the transducer is in a "low" deceleration condition. For "high" vehicle deceleration, however, the contacts of the microswitch would be open such that the resistor is not connected in circuit and the reference level set by the fixed resistor in the electrical antilock circuit would remain unaltered.

In addition to the reference adjustment variable resistor or microswitch, a delay network is provided and is responsive to a sensing signal from the electrical antilock system (which is also applied to the brake release means) to prevent the adjustment of the reference level being effected until a predetermined time period has elapsed since the first antilock sensing of vehicle deceleration during an antilock stop operation. This time period is chosen such as to give the transducer sensing vehicle deceleration sufficient time to reach a steady condition.

Thus, referring to FIG. 5, a sensing signal from the electrical antilock system is applied to a delay network DN, the output of which is connected via diode $D_6$ to relay coil $RL_A$ having an associated normally open contact $A_1$. Coil $RL_A$ is connected in parallel between diode $D_6$ and earth, with relay coil $RL_B$ having associated contact $B_1$. The contact $B_1$ is connected in the line containing the fixed "reference" resistor (not shown) of the electrical antilock system, and is also connected in series with variable resistor VR.

A further relay coil $RL_C$ is connected between earth and a voltage source $V_1$ via a pressure switch PS of the stoplight type and associated contact $C_1$ of relay coil $RL_C$ is connected in series with contact $A_1$ and to a second voltage source $V_2$.

In operation the sensing signal is delayed by delay network DN and relay coil $RL_A$ is energized in response to the delayed sensing signal and held on via contact $C_1$ until braking pressure has been released. Relay $RL_B$ is energized at the same time as relay $RL_A$ to close contact $B_1$ to reduce the reference level set by the fixed resistor when a vehicle is on low-friction surfaces. Contact $C_1$ is closed in response to energization of relay coil $RL_C$ when braking pressure is applied.

In the modified circuit of FIG. 6, the variable resistor VR has been replaced by microswitch MS operated directly by the vehicle deceleration sensing transducer, and connected in circuit with fixed resistor R13 to reduce the reference level in the same manner described for the embodiment of FIG. 5, when a vehicle is on a low-friction surface.

We claim:

1. Vehicle brake control apparatus including:
   a. sensing means for producing electrical signals which are analogues of the speed of a vehicle wheel or associated component,
   b. means for differentiating said analogue signals,
   c. a first comparator device responsive to the differentiated signals for producing a first output signal therefrom whenever the wheel deceleration exceeds a predetermined value,
   d. an inverter device responsive to said first output signal from said first comparator device for producing a second output signal,
   e. braking pressure antilock control valve means responsive to said second output signal to effect brake pressure relief,
   f. means for generating an electrical reference signal having a value determined in accordance with vehicle deceleration,
   g. dual mode integrator means responsive to said analogue signals and to said reference signal for producing a third output signal representative of wheel speed when the integrator means operates according to one mode, and for producing a fourth output reference signal representative of vehicle speed and controlled by vehicle deceleration when the integrator means operates according to the second mode,
   h. a second comparator device responsive to said analogue signals, said output signals from said inverter device and said integrator means for producing a control signal for deactivation of said antilock control valve means to reapply the braking pressure whenever the wheel speed signal is equal in magnitude to the output signal from said integrator means,
   i. and means wherein the output of the second comparator device is connected to a relay coil arranged to be energized whenever the wheel deceleration exceeds said predetermined value and having a pair of associated contacts connected in the circuit of said integrator means, the analogue signals being normally supplied to said integrator means via a first of said pair of contacts and the vehicle deceleration reference signal being supplied via the integrator means to an input of said second comparator device whenever said relay coil is energized to effect brake release via the antilock valve control means.

2. Vehicle brake control apparatus as in claim 1, wherein said means for generating an electrical reference signal having a value determined in accordance with vehicle deceleration includes a potentiometer having the slider thereof positionally controlled by a vehicle deceleration sensing transducer and having two positions representative of high and low vehicle deceleration respectively.

3. Vehicle brake control apparatus as claimed in claim 1, including means connected in circuit with the integrator means to increase the rate of change of electron flow therein and said means being normally isolated from the integrator means but arranged to be coupled thereto whenever said relay coil is energized.

4. Vehicle brake control apparatus as in claim 3, wherein means are provided to adjust the vehicle deceleration reference level and further means for delaying the adjustment for a predetermined period of time following the first antilock sensing.

5. Vehicle brake control apparatus including sensing means for producing electrical signals which are an analogue of the speed of a vehicle wheel or associated component, braking pressure valve control means responsive to electrical signals indicative of wheel deceleration in excess of a predetermined value, to effect brake pressure relief, means for generating an electrical reference signal having a value determined in accordance with vehicle deceleration and further means responsive to said reference signals and said wheel or associated component speed signals to effect actuation of said brake valve control means to reapply the braking pressure when a selected relationship exists between the reference and wheel or associated component speed signals.

* * * * *